Figure 4:
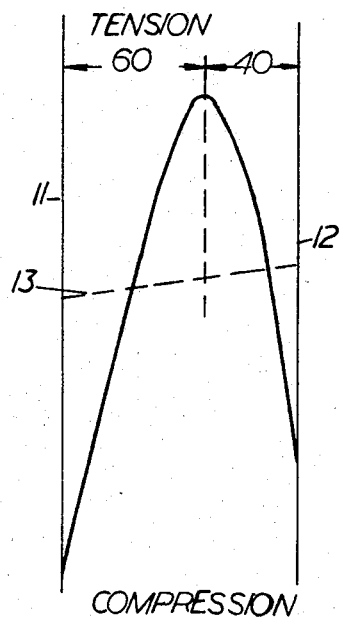

Jan. 9, 1968  W. R. BLOOD  3,362,558
METHOD OF TOUGHENING GLASS ARTICLE AND TOUGHENED
GLASS ARTICLE SO PRODUCED
Filed Nov. 5, 1963  2 Sheets-Sheet 1
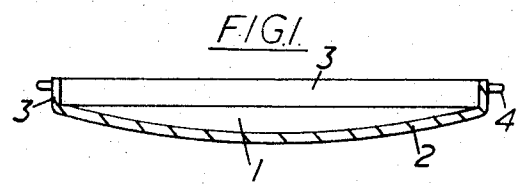
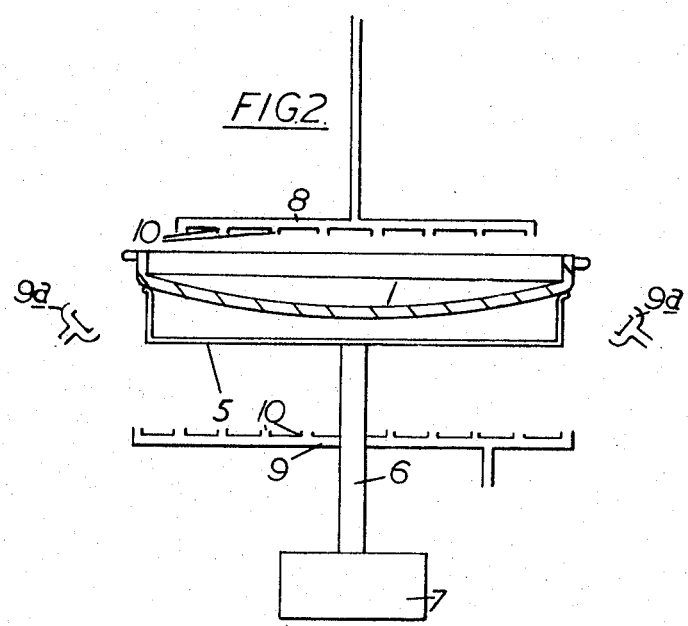
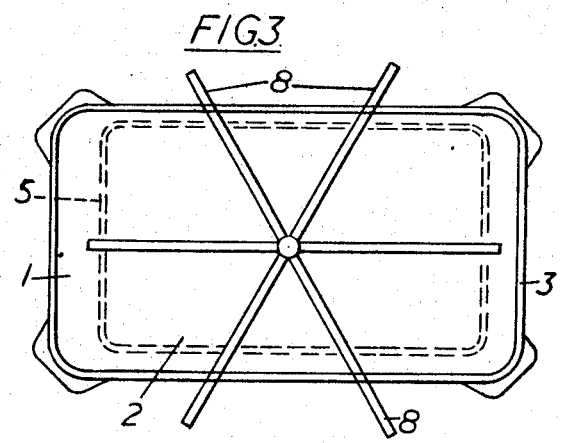
Inventor
Walter Roy Blood
By
Morrison, Kennedy & Campbell  Attorneys Jan. 9, 1968  W. R. BLOOD  3,362,558
METHOD OF TOUGHENING GLASS ARTICLE AND TOUGHENED
GLASS ARTICLE SO PRODUCED
Filed Nov. 5, 1963  2 Sheets-Sheet 2

Inventor
Walter Roy Blood
By
Morrison, Kennedy & Campbell Attorneys

United States Patent Office 3,362,558
Patented Jan. 9, 1968

3,362,558
METHOD OF TOUGHENING GLASS ARTICLE AND TOUGHENED GLASS ARTICLE SO PRODUCED
Walter Roy Blood, Huyton, near Liverpool, England, assignor to Pilkington Brothers Limited, Liverpool, England, a company of Great Britain
Filed Nov. 5, 1963, Ser. No. 321,568
Claims priority, application Great Britain, Nov. 7, 1962, 42,149/62
7 Claims. (Cl. 220—2.1)

This invention relates to methods of toughening glass articles and to toughened glass articles so produced.

In a conventional toughening process, the article to be toughened is heated to a temperature above the strain point of the glass and is then subjected to a quenching action in which the surfaces of the glass are rapidly chilled to set up a temperature-difference between the surfaces and the central portion of the glass. This temperature-difference is maintained until the glass article has been cooled below the strain point of the glass, when the temperature is allowed to become uniform throughout the thickness of the glass and a stress pattern is set up in the glass so that there is a central zone of tension in the glass with compression zones adjacent to the surfaces of the glass.

Toughened glass having these zones of compression and tension has a greater resistance to fracture by the impact of solid bodies than untoughened glass, because such impact breaks the glass by setting up instantaneous local tensile stresses that extend to a certain depth into the surface layers of the glass close to the point of impact; and, if compressive stress has previously been set up in those layers, an impact must be great enough to reverse that compressive stress if it is to cause fracture. Therefore, if the depth to which the tensile stresses due to the impact extend is less than the depth to which compressive stress of sufficient magnitude has been set up by the toughening process, the impact will fail to break the glass. The depth to which an impact induces tensile stress great enough to break the glass depends upon the magnitude of the impact. It follows that the resistance of toughened glass to breakage by impact of solid bodies depends upon the depth at which compressive stress of sufficient magnitude has been set up in the glass by the toughening process.

Consequently it is evident that the impact resistance of a glass article increases as the degree of toughening in the glass article is increased and the compressive and tensile stresses also increase. However, it is not always a practicable commercial proposition to increase the general degree of toughening of a glass article beyond a particular level, because this involves the use of higher pressures and/or greater quantities of the air or other chilling medium and the apparatus necessary to supply the chilling medium at these higher pressures and/or in greater quantities.

In accordance with the present invention, it has now been found that a real improvement in the impact resistance of one surface of a moulded glass article having a main panel portion and a peripheral flange surrounding the said portion may be obtained without increasing the general degree of toughening of the glass article by chilling that surface more strongly than the other surface. In use such a glass article is generally positioned so that only one surface of the panel portion is liable to suffer impacts and consequently it is sufficient for the article to be toughened in such a manner that compressive stress of sufficient magnitude is set up in it at a sufficient depth below that surface.

Accordingly the present invention provides a method of toughening moulded glass articles having a main panel portion and a peripheral flange surrounding the said portion, comprising the steps of heating the glass article to a temperature above the strain point of the glass and then subjecting both surfaces of the main panel portion to a chilling action, characterised in that one surface of the panel portion is more strongly chilled that the other surface whereby, for a given general degree of toughening, the impact resistance of the said one surface of the panel portion is enhanced.

The general degree of toughening of the panel portion of the glass article may conveniently be measured by the mean magnitude of the compressive and tensile stresses present through the thickness of that portion of the article. When the impact resistance of one surface of the panel portion of the glass article has been enhanced without increasing the mean magnitude of the compressive stresses present in the panel portion, the zone of tension, and with it the line of maximum tensile stress, in the interior of the panel portion of the glass article has been moved appreciably away from the said one surface of the panel portion so as to increase the depth to which the zone of compression adjacent to that surface extends below that surface.

Examples of toughened glass articles to which the invention may be applied are bulkhead glasses and glasses for flameproof lighting fittings. The main panel face of these articles may be either curved or flat, and the articles have rigidity by reason of their form; and because they are toughened they have mechanical strength as well as a substantial resistance to impact on their outer surface, which resistance is imparted by the process of the present invention.

In some applications of moulded glass articles wherein the panel portion is curved, the glass may be subjected to a bending pressure applied, for example, to the convex surface of the panel portion and simultaneously to impacts of solid bodies on its concave surface.

One particular example of a moulded glass article having a main panel portion and a surrounding peripheral flange, in which the panel portion is subjected to both a bending pressure and to impacts simultaneously in this way, is an implosion guard such as is provided in the front of a cabinet of a television set in order to protect the viewer from flying fragments if the television tube implodes. Such an implosion guard is described in our copending application No. 286,091. Normally such an implosion guard is curved to form a double curvature base matching the end formation of a television tube so that the base has a convex outer surface and a concave inner surface adjacent to the face of the television tube.

The implosion guard therefore presents its convex surface to the viewer and its concave surface is adjacent to the television tube. When the television tube implodes, the forces to which the implosion guard is subjected are twofold. First there is the suction wave which will apply a bending pressure to the convex surface of the implosion guard, tending to straighten the guard, and second, the concave surface of the guard is liable to receive impacts from flying fragments of the tube itself.

According to this aspect, the present invention provides a method of toughening an implosion guard of a transparent glass, the guard having a convex surface and a concave surface, being respectively the opposed surfaces of a double curvature base matching the end formation of a televison tube, the method comprising the steps of heating the glass to a temperature above the strain point of the glass chilling medium contacting the said concave surface of the heated glass to the quenching action of a gaseous chilling medium, characterised by maintaining during the quenching action a greater rate of flow of the gaseous chilling medium contacting the said concave surface than the rate of flow of the gaseous chilling medium contacting the said convex surface, whereby there is obtained an implosion guard of toughened glass having an enhanced ability to withstand a bending pressure applied to the said convex surface and an enhanced resistance to impact from flying particles on the said concave surface by producing in the toughened glass a tension zone having its line of maximum tensile stress nearer to the said convex surface that to the said concave surface, and consequently a compression zone adjacent to the concave surface thicker than the compression zone adjacent to the convex surface.

An implosion guard produced by the method of the invention has improved implosion characteristics.

Advantageously the tension zone produced in the implosion guard or other moulded glass article has its line of maximum tension at a distance which is between 55% and 65% (for example 60%) of the thickness of the glass from the surface of the glass article which has the enhanced resistance to impact.

The present invention also comprehends moulded glass articles having a main panel portion and a peripheral flange surrounding the said portion which articles have been toughened by a method according to the invention. In particular, therefore, the present invention comprehends a moulded article of toughened glass having a main panel portion and a peripheral flange surrounding the said portion, the main panel portion having a tension zone with its line of maximum tension nearer to one surface of the said panel portion than to the other surface thereof, whereby the said one surface of the main panel portion has an enhanced resistance to impact for a given general degree of toughening of the moulded glass article.

In the use of the invention in toughening an implosion guard, therefore, the present invention comprehends an implosion guard of toughened transparent glass for use in a television tube assembly, the guard comprising a panel portion having a tray formation including a double curvature base matching the end formation of the tube and presenting a convex surface and a concave surface, and a continuous boundary wall adapted to surround the end of the tube and forming a peripheral flange surrounding the said panel portion, the implosion guard having a tension zone with its line of maximum tension nearer to the convex surface of the double curvature base than to the concave surface thereof, whereby the guard has an enhanced ability to withstand a bending pressure applied to the convex surface of the said base, and an enhanced resistance to the impact of flying fragments on the concave surface of said base.

Figure 5:
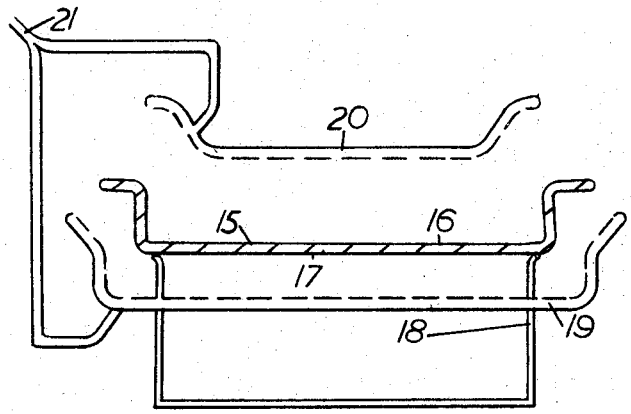

The invention will be more clearly understood from the following detailed description which is made purely by way of example, taken in conjunction with the accompanying diagrammatic drawings in which:

FIGURE 1 shows a section through a moulded glass article suitable for a use as an implosion guard in a television set cabinet, FIGURE 2 shows diagrammatically apparatus for toughening a moulded glass article, for example a television implosion guard, according to the present invention, FIGURE 3 is a diagrammatic plan view of the apparatus of FIGURE 2, FIGURE 4 shows the stress distribution through the thickness of a moulded glass article according to the present invention, and FIGURE 5 shows diagrammatically another moulded glass article and apparatus for toughening that article.

In the drawings, like reference numerals designate the same or similar parts.

Referring first to FIGURE 1 of the drawings, there is indicated generally at 1 a moulded glass article, for example a curved glass pressing, having a main panel portion and a peripheral flange surrounding the said panel portion and suitable for use as an implosion guard. The implosion guard comprises a portion 2 of a tray formation constituting the main panel portion, and a continuous boundary wall 3 which is the surrounding peripheral flange. The tray formation 2 is a double curvature base, that is to say a base having axes of curvature in two dimensions at right angles and the double curvature of the base matches the end formation of a television tube. Conveniently the continuous boundary wall 3 has a radius from the centre of the implosion guard 1 in excess of the outer radius of a television tube so that the continuous boundary wall of the implosion guard is adapted to surround the end of the television tube.

The continuous boundary wall 3 of the implosion guard also has lugs 4 as shown, which assist in locating the implosion guard in a desired position in a television set, for example by the method described in our copending application No. 286,091.

The method by which a moulded glass article, for example the implosion guard of FIGURE 1, may be toughened will now be described with reference to FIGURES 2 and 3 of the accompanying drawings. The moulded glass article 1 is supported on a wire framework 5 mounted on a driving shaft 6 adapted to be rotated by appropriate driving means 7. Once the heated glass article 1 is supported on the wire framework 5, an upper set of quenching arms 8 is brought into position above the concave surface of the glass article 1 for quenching the concave surface while a lower set of quenching arms 9 is brought into position beneath the wire framework 5 so that the lower convex surface of the moulded glass article 1 may be quenched. Also subsidiary quenching sections 9a are brought into position to quench the corner or edge portions of the tray formation 2.

The upper set of quenching arms 8 and the quenching sections 9a are arranged each to be at a distance from the nearest surface of the glass which is about half the distance at which the lower set of quenching arms 9 is positioned from the convex surface of the main panel portion of the glass article. Cool air at room temperature is supplied under pressure to the various sets of quenching arms 8, 9 and 9a, so that the cool air issues from nozzles 10 on the respective quenching arms 8, 9 and 9a at the same pressure. However, owing to the different distances of the quenching arms 8 and 9 from the concave and convex surfaces of the glass, the chilling effect of the air striking the upper concave surface of the glass will be substantially greater than the chilling effect of the air striking the lower convex surface. The actual convex edge portions of the tray formation 2 are chilled to the same extent as the concave surface of the tray formation in order to maintain the necessary mechanical strength where the moulded glass article is sharply curved.

The driving shaft 6 is continuously rotated by the driving means 7 so that the moulded glass article 1 is rotated between the sets of quenching arms 8, 9 and 9a and the chilling air is spread over the surfaces of the moulded glass article 1.

Using the method just described, the moulded glass article is toughened asymmetrically so that the tension zone in the central part of the glass is displaced from the position it would normally adopt towards the convex surface of the glass. Consequently, a compression zone of a greater thickness is formed adjacent to the concave surface of the glass while the compression zone adjacent to the convex surface of the glass is decreased in thickness.

The stress pattern through the thickness of the glass article is shown graphically in FIGURE 4 of the accompanying drawings. Reference numeral 11 indicates the concave surface, and reference numeral 12 the convex surface of the glass. The dotted line 13 indicates zero stress in the glass, compressive stress being shown below the dotted line 13 and tensile stress above that line.

By the use of the present invention, there is obtained an improved curved implosion guard for use in a television set, the implosion guard having a compression zone of increased thickness adjacent to its concave or inner surface because the line of maximum tensile stress within its thickness is positioned nearer to the convex surface than to the concave surface. When a television tube implodes, adjacent to an implosion guard according to the invention, the big suction immediately behind the implosion guard exerts an inward bending effect tending to throw the inside concave surface into tension. Accordingly the implosion guard has a greater resistance to this bending action by reason of the asymmetric toughening, and the bending action does not put the concave surface into tension owing to the increased thickness of the compression zone adjacent to that surface. The concave surface thus has an increased strength to resist bending pressure upon the convex surface and an increased resistance to impact from flying particles which strike the concave surface as a result of the implosion. It is therefore particularly to be noted that the guard has a good impact resistance on the surface which tends to be thrown into tension.

Referring now to FIGURE 5 of the accompanying drawings, there is shown a moulded glass article 15 having a main panel portion comprising surfaces 16 and 17. The article 15 is supported on a wire framework 18 between quenching frames 19 and 20. In the arrangement shown, the quenching frames 19 and 20 are both fed with cool air at a temperature of the order of 20° C. from a common pipe 21.

The quenching frame 19 is positioned closer to the surface 17 of the moulded glass article 15 than is the quenching frame 20 to the surface 16 of the moulded glass article. Consequently, in the case of the moulded glass article 15 shown in FIGURE 5, it is the lower surface 17 which has the increased thickness of the compression zone adjacent to it for the given general degree of toughening of the moulded article 15.

Moulded glass articles which have been toughened by the process of the present invention are found to exhibit, on the surface which has been more strongly chilled, a greater resistance to impact tests than have comparable articles which have been symmetrically toughened to the same general degree of toughening. For example, it has been found that steel balls ⅛ inch in diameter need to be projected at a velocity of the order of 90 miles an hour at the concave surface of the moulded glass implosion guard 1 toughened by the process described with reference to FIGURES 2 and 3, in order to fracture the implosion guard. On the other hand, a similar steel ball has only to be projected at the convex surface of the same moulded glass implosion guard 1 at a velocity of the order of 60 miles an hour in order to induce fracture.

If the moulded glass implosion guard is toughened by a normal toughening process so that the glass is symmetrically toughened in the main panel portion, it is found that a steel ball ⅛ inch in diameter projected at a velocity of the order of 80 miles an hour will fracture the glass, whichever surface it is directed at.

Although the invention has been described as being effected by directing air at an equal pressure from sets of quenching arms disposed at different distances from the respective surfaces of the moulded glass article to obtain different rates of abstraction of heat from the said surfaces, it will be appreciated that other methods may readily be employed for obtaining asymmetric toughening. For example, the two sets of quenching arms shown in FIGURE 2 may be disposed at the same distances from the two surfaces of the glass, but a greater number of nozzles 10 may be provided on the upper set of quenching arms 8 so that a greater chilling effect is exerted on the upper concave surface of the glass by the upper set of quenching arms.

Another alternative method of carrying out the invention is to provide identical sets of quenching arms each positioned on its respective side of the glass at the same distance from the glass, but to supply the air at a greater pressure to the upper set of quenching arms 8 so that the air issues from the upper set of quenching arms at a greater speed than the air issuing from the lower set of quenching arms and a greater chilling effect is exerted on the upper concave surface of the moulded glass article 1 by the greater rate of flow of the cold air contacting the concave surface.

I claim:

1. A method of toughening an implosion guard of a transparent glass, the guard having a convex surface and a concave surface, being respectively the opposed surfaces of a double curvature base matching the end formation of a television tube, the method comprising the steps of initially evenly heating the glass to a temperature above the strain point of the glass, applying a gaseous chilling medium to both the convex and concave surfaces of the heated glass and regulating the flow of the chilling medium so that there is a greater rate of flow of the gaseous chilling medium contacting the said concave surface than the rate of flow of the gaseous chilling medium contacting the said convex surface to produce in the toughened glass a tension zone having its line of maximum tension from 55% to 65% of the thickness of the glass from said concave surface.

2. A method according to claim 1 wherein the said line of maximum tension is at a distance of approximately 60% of the thickness of the glass from the concave surface of the glass.

3. A toughened moulded glass article having a main panel portion and a peripheral flange surrounding the said portion, the main panel portion having a tension zone with its line of maximum tension from 55% to 65% of the thickness of the glass from one surface of the said panel portion, whereby said one surface of the main panel portion has an enhanced resistance to impact.

4. An implosion guard of toughened transparent glass for use in a television tube assembly, the guard comprising a panel portion having a tray formation including a double curvature base matching the end formation of the tube and presenting a convex surface and a concave surface, and a continuous boundary wall adapted to surround the end of the tube, and forming a peripheral flange surrounding the said panel portion, the implosion guard having a tension zone with its line of maximum tension from 55% to 65% of the thickness of the glass from the concave surface, whereby the guard has an enhanced ability to withstand a bending pressure applied to the convex surface of the said base and an enhanced resistance to the impact of flying fragments on the concave surface of said base.

5. An implosion guard according to claim 4 wherein the line of maximum tension is at a distance of about 60% of the thickness of the glass from the concave surface of the glass.

6. A method of toughening a moulded glass article having a main panel portion so as to enhance the impact resistance of one surface of the panel portion, comprising the steps of initially evenly heating the glass article to a temperature above the strain point of the glass, applying controlled amounts of cooling fluid to opposite surfaces of said panel portion for controlled time intervals, and regulating the application of the cooling fluid so that said one surface of the panel portion is more strongly chilled than the other surface and the line of maximum tension in the thickness of the panel portion is from 55% to 65% of the thickness from said one surface of the panel portion.

7. A method of toughening a moulded glass article having a main panel portion in order to increase the impact resistance of one surface of the panel portion, comprising the steps of initially evenly heating the glass article to a temperature above the strain point of the glass, applying cooling fluid to opposite surfaces of said panel portion for controlled time intervals, the amount of cooling fluid supplied to said one surface thereof being sufficiently greater than the amount supplied to the other surface thereof that maximum tensional stress is attained in the zone of the thickness of the panel portion which is from 55% to 65% of the thickness of the glass from said one surface of the panel portion.

References Cited

UNITED STATES PATENTS

| | | | |
|---|---|---|---|
| 2,376,872 | 5/1945 | Harris | 65—115 |
| 2,881,566 | 4/1959 | Badger | 65—30 |
| 2,969,162 | 1/1961 | Stutske | 220—2.1 |
| 2,991,591 | 7/1961 | Gabor et al. | 65—115 |
| 3,004,863 | 10/1961 | Gray et al. | 65—30 |
| 3,071,280 | 1/1963 | Mayhew et al. | 220—2.1 |
| 3,262,768 | 7/1966 | Carson | 65—114 |

DONALL H. SYLVESTER, *Primary Examiner.*

THERON E. CONDON, *Examiner.*

A. D. KELLOGG, M. L. RICE, *Assistant Examiners.*

UNITED STATES PATENT OFFICE
CERTIFICATE OF CORRECTION

Patent No. 3,362,558 January 9, 1968

Walter Roy Blood

It is hereby certified that error appears in the above numbered patent requiring correction and that the said Letters Patent should read as corrected below.

Column 2, line 65, for "chilling medium contacting the said concave surface" read -- and then subjecting both the convex and concave surfaces --.

Signed and sealed this 11th day of February 1969.

(SEAL)
Attest:

Edward M. Fletcher, Jr.
Attesting Officer

EDWARD J. BRENNER
Commissioner of Patents